Patented Apr. 30, 1946

2,399,232

UNITED STATES PATENT OFFICE 2,399,232

OPAQUE VITREOUS ENAMELS

Ignaz Kreidl and Werner Kreidl, Cleveland, Ohio

No Drawing. Application March 17, 1941, Serial No. 383,794

9 Claims. (Cl. 106—40)

This invention relates to a process for the preparation of gas opacified enamels which are prepared from an enamel mass without the use of a suspension agent or more particularly to vitreous enamels prepared by the dry process, or glass enamels and glazes, and the like.

In the conventional process for the preparation of gas opacified enamels by the wet process it was customary to use gas opacifying substances which were absorbed on the suspension agent for the enamel slip such as especially gas opacifying substances absorbed on clay. In this way it was possible to have the gas opacifying substance finely distributed throughout the enamel slip and to regulate its gasification. In contradistinction to the customary wet process, dry process enamels and most glass enamels and glazes are prepared without the use of a suspension agent such as clay. It need not be mentioned that for the dry process enamels a suspension agent is not necessary since the ground enamel is dusted in the dry state onto the heated surface of the ware to be enameled. In the case of glass enamels or glazes it is customary to prepare the slip by finely grinding the enamel frit or glaze frit and to suspend it directly in a vehicle such as more particularly in alcohol or other organic vehicles, such as oils, varnish bases or the like.

It is known that gas opacifiers can not be melted into the frit since at the temperatures prevailing at and in the time necessary for the melting of the frit it would be impossible to retain a sufficient amount of gas bubbles in a sufficiently fine size and distribution in the frit. Accordingly, regardless of the type of enamel or glaze for which gas opacification is to be used the gas opacifying substance always will have to be added to the mill or will have to be mixed otherwise with the frit and if desired also with other additions. In order to utilize gas opacification for such enamels or glazes which are prepared without the use of a suspension agent it has been suggested to introduce the gas opacifying substance in a finely distributed way by introducing a sufficient amount of clay having the gas opacifying substance absorbed thereon. It was found that although satisfactory opacity could be obtained in this way the clay produced unfavorable effects on the finished enamels, such as a porous surface, or matte surface and the like.

An object of the present invention is to provide a method for introducing gas opacifiers into enamels of the type dispensing with the use of suspension agents in a way which warrants even and fine distribution thereof. Another object of this invention is to provide a method for utilizing gas opacity for dry process enamels. Another object of the invention is to provide a method for utilizing gas opacity for wet process enamels or glazes which are prepared without the use of a suspension agent for the enamel slip or slurry. Further objects of the invention will become apparent in the following description.

The present invention is based on the fact that gas opacifying substances can be evenly distributed in and introduced into an enamel mass or glaze which is prepared without the use of a suspension agent when incorporating the gas opacifying substance in a material capable of distributing it in its pores so as to separate and subdivide the gas opacifying substance more or less independently of the fineness of the frit or glaze or other additions in the enamel mass. It should be noted that by "introducing into the enamel mass or glaze" it is to be understood that the gas opacifying substance which is incorporated in the pores of the enclosing material is to be mixed with the enamel frit or glaze frit and if necessary with other additions. Thus, for example, the opacifying substance incorporated in the pores may be added to the mill together with the other mill additions such as the enamel or glaze frit.

It was found that more particularly extremely porous substances such as gels or gel-like substances and especially such inorganic substances will be suitable for the introduction of the gas opacifying substance into the enamel mass. Preferably substances will be selected which in the dry state without the gas opacifying substance being incorporated therein have pores of a submicroscopic size that is smaller than about $10^{-4}$ cm. in diameter and it will be also of great advantage if such substances contain at least about 70% by volume air. Furthermore it will be advantageous if such enclosing substances will retain their structure up to fairly high temperatures during the firing process. More particularly such inorganic substances will be of advantage since they will aid in providing the permanent network for the opacifying gas bubbles which are developed on firing of the enamel.

Especially suitable for the method according to the present invention, therefore, will be substances of the type of aerogels. Aerogels are known for their fine porosity and the extremely high air volume they contain. It is well known to those skilled in the art how such aerogels may be prepared and the preparation of such aerogels does not form subject of the present invention. Just by way of illustration it may be mentioned that such aerogels may be prepared by gradually replacing the first liquid phase by other liquids being miscible with the preceding liquid phase but having a lower critical temperature. Finally the last liquid phase will be removed at a temperature above its critical temperature whereby it is obtained that the original gel structure is preserved. Such aerogels as a rule will have pores which have a diameter of approximately $10^{-6}$ cm. and will include well above 80% volume by air, and such as about 90% volume by air and more.

It should be noted that the above given description of the gel structures and the included air volumes applies to the structure prior to the incorporation of the gas opacifying substance rather than to the structure after the incorporation. Thus in the case of aerogels it may well happen that when the gas opacifying substance is introduced in the form of a solution that on removal of the solvent after the introduction of the gas opacifying substance the volume will greatly decrease. However the original structure will have substantially aided in providing optimal distribution of the gas opacifying substance by allowing a large volume of the solution to penetrate into the pores allowing most of the gas opacifying substances to be enclosed by the enclosing substance.

Substances which will be suitable as such gels or aerogels are, for example, the gels or aerogels of silica, thorium oxide, zirconium oxide, the rare earth oxides, and of many other inorganic oxides and compounds which are capable of forming gels or aerogels.

As an example of a gel-like substance porous glass may be mentioned such as, for example, is obtained as an intermediate in the preparation of "Vycor"-glass. "Vycor" is a trade-mark by Corning Glass Works, Corning, N. Y., and designates a glass which contains about 5% $B_2O_3$, 5% $Na_2O$, the remainder being silica. The production of such a glass is described in Brit. Patent 442,526 of August 8, 1934. As is known to those skilled in the art, this type of high silica glass is obtained from certain borosilicate glasses which have a tendency towards immiscibility and which can be separated into two immiscible phases by a heat treatment which gives rise to the formation of one continuous phase of a glass rich in boric oxide and of another one which contains well above 90% silica. The boric oxide phase may be leached out with mineral acids and thus a highly porous glass may be obtained. The extreme fineness of the pores may be judged from the fact that such a porous glass appears to be optically void under the microscope and that the air inclusions give rise to a slight bluish opalescence only.

In view of the ease of handling, the advantageous physical properties, the heat stability, the compatibility with almost any type of enamel, and the commercial availability the use of silica aerogel will be preferred for the incorporation of the gas opacifying substance.

This invention, however, is not restricted to any of the above described gels or gel-like substances and it will be clear to those skilled in the art how to select a suitable substance in the capillaries of which the opacifying substance can be evenly distributed and subdivided. It will be advantageous to use such substances for the incorporation of the gas opacifying substance which is in the form of a fine powder to start with or which can be readily ground or otherwise disintegrated.

In any case the gas opacifier composition according to the present invention has to be prepared prior to its addition to the enamel mass. The gas opacifier composition according to the present invention may be conveniently prepared by incorporating the gas opacifying substance proper in the pores, for example, of a gel-like substance in the form of a solution, suspension, dispersion, or the like so that the opacifying substance proper may thoroughly penetrate the pores of the enclosing substance. In many cases it will be advantageous to remove the solvent prior to the use of the thus formed opacifier composition. Alternatively the gas opacifier composition may be formed simultaneously with the enclosing substance. Thus for example, a solution of both the gas opacifying substance and the raw material capable of forming the enclosing substance may be precipitated simultaneously. Thus a solution of a dye and a sol may be mixed together and the precipitated gel will enclose the dye in its pores. The thus produced product may be dried so as to remove the solvent retained in the precipitate. Various other methods for preparing the opacifier compositions for the present invention will suggest themselves to those skilled in the art, and this invention is not restricted to any specific method for preparing them. As mentioned above other substances than gel-like substances may be used as enclosing substances as long as they have a sufficiently porous structure so as to substantially enclose the gas opacifying substance proper.

By using the opacifier compositions according to the present invention, namely a gas opacifying substance which is finely sub-divided in the pores of a highly porous substance, it becomes possible to finely distribute the opacifier in the enamel mass with the use of a relatively small amount of the porous substance. Thus, for example, when using one of the above mentioned inorganic gels as the porous substance subdividing the gas opacifying substance it will be possible to finely distribute the gas opacifier composition in the enamel mass by introducing only a fraction of a percent of the opacifier composition. The absolute amount necessary, of course, will depend on the gas opacifying substance used and on the concentration of the gas opacifying substance in the porous material. However, in most cases it will not be necessary or beneficial to use such low concentrations of the gas opacifying substance in the enclosing material that introduction of more than 1 to 3% of the opacifier composition calculated on the enamel frit will be necessary. It can be readily seen, therefore, that the use of such gas opacifier compositions makes it possible to finely distribute the gas opacifying substance proper with the use of so little of a foreign substance that it cannot in any way affect the physical properties of the finished enamel.

There is no definite relation between the amount of the gas opacifying substance and the enclosing substance and the sufficient amount of the enclosing substance will have to be determined by a few preliminary experiments. In any case there should be enough of the enclosing substance available so as to enclose a prevalent portion of the gas opacifying substance. Just by way of example it may be mentioned that into silica aerogel 30% by weight of coal tar in a benzol solution may be introduced readily without having even approached the upper limit which can be effectively introduced. Accordingly this invention is not limited to any specific ratio between the enclosing substance and the gas opacifying substance enclosed therein and it will be understood by those skilled in the art how much of any specific gas opacifying substance can be safely introduced into the enclosing substance. Generally speaking, it may be mentioned that to be on the safe side one rather should use less than the maximum amount of the gas opacifying substance for any given amount of the enclosing substance.

With respect to the preparation of dry process enamels, the use of gas opacifying substances will be more or less unrestricted; that means almost any type of gas opacifying substance which is suitable in itself and which can be incorporated in the pores of the porous substance can be used. As a matter of fact, the variety of substances which becomes available for dry process enameling will be given greater than that which was available for the customary wet process since in the dry process the gas opacifying substance once it is enclosed in the pores of the porous substances will have no occasion to react with its surroundings. Accordingly, any substance which is capable of evolving gases within the firing range of the enamel at a time where the bubbles can be retained due to the fusion of the enamel will be suitable.

When applying the process of the present invention to the manufacture of enamels or glazes by the wet process without the use of a suspension agent, the selection of a suitable gas opacifying substance will be somewhat more restricted than for the dry process proper. In this case, it will be preferable to select gas opacifying substances which cannot be dissolved by the mill liquor so as to retain the gas opacifier within the pores of the porous material and to prevent diffusion of the gas opacifier into the mill liquor. Thus, for example, where oils or other organic vehicles are used as a suspension liquid oil insoluble water soluble dyes may be used as opacifying agents. It will be easy for those skilled in the art to select the proper gas opacifying substance for any given suspension liquid. In this connection it may be mentioned that for gas opacifiers of a strongly reducing nature the use of lead bearing enamels or glazes should be avoided or that for such lead bearing enamels or glazes gas opacifying agents of as little reducing character as possible, preferably of oxidizing character should be used.

However the selection of a gas opacifying substance does not form subject of the present invention and a large variety of suitable gas opacifying substances are known to those skilled in the art.

The preparation of enamels or glazes according to the present invention does not necessitate any change of the conventional procedure perhaps with the one exception that for the dry process according to this invention the opacifier will be added to the mill or otherwise mixed with the enamel frit, while heretofore opacifiers for the dry process in most cases were added to the raw batch and thus incorporated in the frit. In preparing dry process enamels according to the process of the present invention it often will be advantageous not to subject the gas opacifier composition to too harsh a grinding operation since by too harsh grinding its effectiveness may be impaired. Accordingly it may be advisable to add the gas opacifier composition to the mill not at the start of the grinding process but only at a time where it still will be sufficiently distributed throughout the enamel mass. Alternatively it may be advantageous to subject the frit, the gas opacifier composition, and any other mill additions which might be used to the milling operation in the presence of water or another liquid a precaution which will protect the gas opacifier composition from too harsh grinding. After milling the enamel mass may be dried and dusted onto the ware to be enameled in the usual way. When using a wet grinding operation for grinding and mixing the enamel mass for a dry process enamel it will be advantageous to us such gas opacifying substances incorporated in the pores of the enclosing material which will not be dissolved out of it by the mill liquor. Sometimes it may also be of advantage to introduce the gas opacifier composition according to the present invention into the enamel mass of a dry process enamel together with a finely ground inert material such as with a finely ground portion of the enamel frit proper so as to warrant a more even distribution thereof in the enamel mass especially whenever the enamel frit proper is used in a relatively coarse grind. Such an inert addition may be used with advantage in amounts to bring the total addition of the mixture of the opacifier composition and said inert material up to about 4 to 6% calculated on the frit proper. Such an inert substance, for example a finely ground enamel frit, may be used in a mill fineness of about 1 to 4% residue on a 200-mesh screen.

The present invention may be illustrated by the following examples:

*Examples*

Opacifier compositions were prepared in the following way:

A. 84 g. "Santocel," which is a silica aerogel prepared by Monsanto Chemical Comp., was impregnated with a solution of 16 gms. "Du Pont Oil Red" in about 500 cc. benzol by pouring the dyestuff solution over the silica aerogel and kneading the formed dough for about 4 hours in a kneading machine. The resulting material was then thoroughly dried.

B. An opacifieer composition was prepared in the same way as under A from 97.5 g. "Santocel" and from a solution of 2.5 gms. "Du Pont Oil Red" in about 500 cc. benzol.

C. An opacifier composition was prepared in the same way as under A from 90 gms. "Santocel" from a solution of 10 gms. "Du Pont Oil Yellow" in about 500 cc. benzol.

About 2.6 gms., 14 gms., and 4 gms. of the opacifier compositions under A, B, and C respectively were thoroughly mixed with 1000 grams of a lead-free cast iron dry process enamel frit. The thus formed enamel masses were dusted onto heated cast iron ware in the usual way and lead to white gas opacified cast iron enamels.

This invention is not restricted by any of the above given examples but is to be understood in its broad scope as given in the appended claims. The term "enamel mass" as used in the specification and in the appended claims is to be understood to comprise also glaze materials which comprise the frit proper as well as any other mill additions which may be used for any type of enamel or glaze being free from a suspension agent. The term "suspension agent" as used in the description and in the appended claims is to be understood to comprise such substances as clay in aqueous enamel slips which are solid substances which substantially help the frit to be held in suspension in the enamel slurry. Accordingly the term "enamel mass free from a suspension agent" comprises enamel masses which are not suspended in a liquid at all as well as enamel masses in which the frit is suspended in the mill liquid directly without the aid of any other solid substance. The term "aerogel" as used in the description and in the appended claims is meant to indicate that a gas opacifying substance has been incorporated in an aerogel regardless of the physical structure of the thus resulting gas opacifier composition subsequent to the incorporation and to the possible removal of the solvent for the gas opacifying substance proper. The term "gel-like" as used in the appended claims is to be understood to comprise true gels and substances of a structure approximating such true gels.

What we claim is:

1. In the method of preparing vitreous enamel and glazes from an enamel mass free from a suspension agent the step of introducing a gas opacifier composition into the enamel mass, said gas opacifier composition being a gas opacifying substance incorporated in the pores of an inorganic gel-like substance capable of distributing and subdividing said gas opacifying substance in its pores.

2. In the method of preparing vitreous enamels and glazes from an enamel mass free from a suspension agent the step of introducing a gas opacifier composition into the enamel mass, said gas opacifier composition being a gas opacifying substance incorporated in the pores of an inorganic gel-like substance the pores of which in the dry state without the gas opacifying substance being incorporated therein are substantially of submicroscopic size.

3. In the method of preparing vitreous enamels and glazes from an enamel mass free from a suspension agent the step of introducing a gas opacifier composition into the enamel mass, said gas opacifier composition being a gas opacifying substance being incorporated in the pores of an inorganic gel-like substance which in the dry state and without the gas opacifying substance being incorporated therein has pores which are substantially of submicroscopic size and which contains at least about 70% by volume air.

4. In the method of preparing vitreous enamels and glazes from an enamel mass being free from a suspension agent the step of introducing a gas opacifying substance which is substantially incorporated in the pores of a silica aerogel into the enamel mass.

5. In the method for preparing dry process vitreous enamels the step of preparing an enamel mass at least from an enamel frit and a gas opacifier composition, said gas opacifier composition being a gas opacifying substance incorporated in the pores of a silica aerogel.

6. In the method for preparing glass enamels the step of preparing an enamel slurry free from a suspension agent from at least an enamel frit, a suspension liquid, and a gas opacifier composition, said gas opacifier composition being a gas opacifying substance which is substantially insoluble in the enamel slurry and which is incorporated in a silica aerogel.

7. In the method of preparing vitreous enamels and glazes from an enamel mass being free from a suspension agent the step of introducing a gas opacifying substance which is substantially incorporated in the pores of an inorganic aerogel into the enamel mass.

8. In the method of preparing dry process vitreous enamels which comprises preparing an enamel mass at least from an enamel frit and a gas opacifying substance substantially incorporated in the pores of an inorganic aerogel.

9. In the method of preparing glass enamels which comprises preparing an enamel slurry free from a suspension agent from at least an enamel frit, a suspension liquid and a gas opacifier composition, said gas opacifier composition being a gas opacifying substance which is substantially insoluble in the enamel slurry and which is substantially incorporated in an inorganic aerogel.

IGNAZ KREIDL.
WERNER KREIDL.